3,209,826
SAND CONSOLIDATION METHOD
Bill M. Young, Duncan, Okla., assignor to Halliburton Company, Duncan, Okla., a corporation of Delaware
No Drawing. Filed Feb. 25, 1963, Ser. No. 260,825
17 Claims. (Cl. 166—33)

This application is a continuation-in-part of U.S. application Serial No. 177,188, filed March 5, 1962, now abandoned.

The present invention relates to a new and improved method of consolidating and controlling loose sands or earthen formations and particularly those sands or formations traversed by a bore hole.

The present invention especially relates to a new and improved sand consolidation method wherein an in situ curing of a resinous fluid is provided.

Various sand consolidation methods and techniques have been employed to prevent or inhibit sand movement with crude oil production. Some of the methods heretofore employed are: gravel packing, use of various filter materials, the use of mechanical filters and screens, cementing with preservation of interstices, packing the formation with resin coated ground walnut hulls, wetting the unconsolidated sand with a bonding resin, and placing a resin treated sand between the loose sand in the formation and the well bore so as to form a screen. These methods have met with varying degrees of success.

One of the particular problems in placing resinous fluids in unconsolidated formations is that such fluids must be catalyzed at the surface of the well or well bore. The present invention is adapted to overcome this problem as well as other problems presented by prior art methods.

It is an important object of the present invention to provide a new and improved permeable and consolidated barrier adjacent to a well bore so as to facilitate fluid production essentially free of solids.

Another important object of the present invention is to provide a new and improved resinous system for consolidating loose sands wherein an in situ curing of the consolidating fluid or resin is provided, which system is essentially immiscible with hydrophilic consolidating fluids. Such a characteristic minimizes the chances of removing so much bonding material from the pore spaces that satisfactory consolidation of the loose sands is not accomplished.

It is a particular object of the present invention to provide a new and improved catalyst-oil overflush solution for curing acid set resins, wherein a halogenated low molecular weight organic acid or acid producing compound is dissolved or dispersed in the oil.

It is an important object of the present invention to provide a new and improved method of consolidating loose or incompetent sands in an oil producing formation wherein a consolidation of such sands is obtained having sufficient strength and permeability to permit an essentially sand-free production of the oil or well fluids.

Other objects and advantages of the present invention will become more readily apparent from a consideration of the description hereinbelow.

The present invention basically consists of first pumping an acid curable consolidating fluid into the unconsolidated sand or earth formation and secondly pumping an oil overflush solution containing a halogenated organic or other organic acid or delayed acid producing chemical. A small quantity of diesel oil spacer may be used between the plastic and catalyst solution if desired. The overflush functions to remove the excess bonding material from the existing pore spaces to provide the necessary permeability and its acid or acid producing component promotes subsequent hardening of the remaining film of consolidating fluid which covers the sand or earth particles thereby consolidating or stabilizing the loose formation.

In the preferred form of the invention, the curing or hardening agent is dissolved in an overflush vehicle or solution which possesses a relatively high degree of immiscibility with the bonding material. Such a favorable characteristic considerably lessens the possibility of removing too much of the consolidating fluid away from the sand or earth particles.

It has been discovered that low molecular weight oil soluble halogenated organic acids and acid producing chemicals may be dissolved or dispersed in an oil overflush solution for curing various resins, resin systems and resinous mixtures in both calcareous and non-calcareous environments.

Trichloroacetic acid and benzotrichloride have been found to be particularly satisfactory. Other oil soluble acids suitable for use in the present invention are halogenated aliphatic monocarboxylic acids having the general formula:

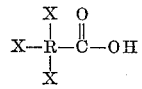

wherein:

R = An alkyl group having from 1–10 carbon atoms,
X = Halogen, hydrogen, at least one halogen in the compound.

In addition to trichloroacetic acid, some other acids of this group are: chloroacetic, dichloroacetic, bromoacetic, iodoacetic, trifluoroacetic, monochlorodifluoroacetic, 2-chloropropionic, 3-chloropropionic, perchloropropionic, perfluoropropionic, and monochloroacetic.

Other oil soluble acids suitable for use in the present invention are halogenated and nitrated aryl monocarboxylic acids having the general formula:

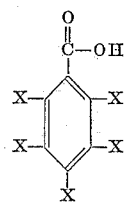

wherein: X = Halogen, hydrogen, or $NO_2$, with at least one halogen or nitrate group in the compound.

Some examples of the acids of this group are: m-chlorobenzoic, p-chlorobenzoic, 2,4-dichlorobenzoic, 2,3,5-triiodobenzoic, and o-nitrobenzoic.

Some other oil soluble acids suitable for use in the present invention are monocarboxylic acids having the general formula:

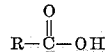

wherein: R = an alkyl group having from 1–10 non-ringed carbon atoms or an aryl group.

Some examples of the acids of this group are: acetic, acrylic, benzoic, and vinyl acetic.

Oil soluble acid forming chemicals suitable for use in the present invention are halogenated alkyl aryl compounds having the general formula:

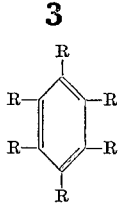

wherein:

R=

group, halogen or hydrogen

X=hydrogen or halogen, with compound having at least one halogen group.

In addition to benzotrichloride or α,α,α-trichlorotoluene, some examples of compounds of this group are: α,α-dichlorotoluene, α-chlorotoluene, α,α,α,α',α',α'-hexachloro-p-xylene, bromotoluene, α,α,α - trifluorotoluene, α,α'-dichloro-p-xylene, o,α,α,α-tetrachlorotoluene, p,α,α,α-tetrachlorotoluene, α,3,4-trichlorotoluene, and α,α,2,6-tetrachlorotoluene.

Other oil soluble acid forming compounds suitable for use in the present invention are halogenated ketones having the general formula:

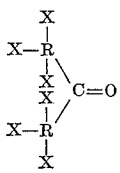

wherein:

R=alkyl group having 1–10 carbon atoms
X=hydrogen or halogen, with each R group having at least one halogen.

Some examples of compounds of this group are: hexachloroacetone, hexafluoroacetone, 1,3 - dichloro - 2-propane, dichlorotetrafluoroacetone and trichlorotrifluoroacetone.

Other oil soluble compounds suitable for use in the present invention are esters of halogenated aliphatic carboxylic acids having the general formula:

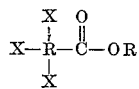

wherein:

R=an alkyl group having from 1–10 carbon atoms
X=hydrogen or halogen with at least one halogen substituent in the compound.

Some examples of the compounds of this group are: butyl trichloroacetate, butyl monochloroacetate, butyl dichloroacetate, methyl bromoacetate, and methyl-2,3-dichloropropionate.

Other oil soluble compounds suitable for use in the present invention are esters of aliphatic dicarboxylic acids having the general formula:

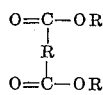

wherein: R=an alkyl group having from 1–10 carbon atoms.

Some examples of compounds of this group are: dibutyl oxalate, di-isopropyl oxalate and ethyl malonate.

Other oil soluble organic compounds suitable for use in the present invention are the esters of halogenated inorganic acids. Dioctylchlorophosphate is an example of this type of compound.

Oil soluble acids or acid producing chemicals suitable for use in the present invention are those whose molecules contain one or all of the following atoms: Cl, Br, I, F, O, and N, with the minimum solubility requirement of the above chemicals being set at .05 gram per 100 grams of solvent at 25° C.

Combinations of the various acid and acid forming chemicals of this invention may also be used, if desired.

Any acid curable resin system may be used in the present invention, and particularly favorable results have been found with hydroxyaryl aldehyde resins, furfuryl alcohol resins and urea formaldehyde resins.

Benzotrichloride or other acid producing compound disclosed hereinabove may be added to an oil overflush to provide the delayed acid producing chemical. Benzotrichloride when contacted with water produces hydrochloric and benzoic acids.

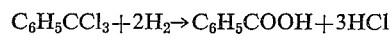

$$C_6H_5CCl_3 + 2H_2O \rightarrow C_6H_5COOH + 3HCl$$

In using benzotrichloride-oil type overflushes with acid curing resin systems such as urea-formaldehyde, furfuryl alcohol, hydroxyaryl aldehyde and other acid curable resins, the production of the above acids causes the necessary curing or hardening process to take place. The contact of the water portions of the bonding fluids with the acid producing compound or benzotrichloride overflush promotes the necessary hydrolyses which result in the liberation of the acid. Water in the stabilizing or consolidating fluids results from water contamination from the wetted surface of the solids to be consolidated and/or from deliberately making water a definite component of the consolidating fluid.

The acid produced from the benzotrichloride or other acid producing chemical is liberated in a useful and delayed manner minimizing the likelihood of a premature curing of the resin before sufficient permeability has been attained.

An important advantage of using benzotrichloride in particular in the oil overflush is that the acid produced is sufficiently strong to cure resin systems which demand a relatively low pH environment.

Another important advantage of benzotrichloride contained in oil is that such solution or fluid is considerably less dangerous to handle in the field than the strong aqueous acid solutions presently used.

It should be noted that the present invention is not limited to sand or earthen consolidations, but can be used whenever an in situ curing of an acid curing resin is desirable. For example, fracturing propping agents may be coated with an acid hardenable or precipitable bonding material or acid curable resin, dispersed into a fracturing fluid and placed in the formation thereby, and then consolidated in situ into a hard permeable mass by treatment with a resin catalyst dispersed or dissolved in oil such as the benzotrichloride-oil overflush, other acid producing chemical-oil overflush, or halogenated acid-oil overflush thus consolidating the propping agents into a hard permeable mass.

Urea-formaldehyde resin, because of its relatively low cost, workability, handling properties, effectiveness, as well as other desired characteristics, was extensively tested.

The process or method when utilizing benzotrichloride and urea-formaldehyde resin broadly consists of: pumping or otherwise introducing the urea-formaldehyde consolidating fluid into the sanding formation to be stabilized, and then following such fluid with an oil containing the dissolved delayed acid producing chemical (benzotrichloride). The overflush solution removes the excess consolidating fluid from the pores of the sand or formation. The water in the urea-formaldehyde mix hydrolyzes the benzotrichloride to produce hydrochloric acid. The hydrochloric acid subsequently polymerizes the bonding or consolidating material which results in a consolidated permeable sand barrier to the movement of sand. The chemicals or materials used can be readily mixed at a field camp or other suitable place and then taken to the well site for performing the sand consolidation jobs.

The effectiveness of a preferred form of the acid producing chemical-oil overflush of the present invention is illustrated by the following tests and tables:

CHEMICALS AND MATERIALS USED IN OBTAINING RESULTS SHOWN IN TABLE I–VII

*UF–85 concentrate.*—A liquid chemical mixture of urea and formaldehyde manufactured by Allied Chemical Corporation. Its composition is 25% urea, 60% formaldehyde and 15% water. The mole ratio of urea to formaldehyde is 1:4.8.

*Urea.*—A commercial grade of urea manufactured by Allied Chemical Corporation.

*Benzotrichloride.*—A commercial grade of benzotrichloride manufactured by Eastman. It is classified as an oil soluble chemical.

*Standard brine solution.*—An average oil field brine consisting of 240:18:1.34:1 $H_2O$, NaCl, $CaCl_2$, and $MgCl_2 \cdot 6H_2O$, respectively by weight.

*Diesel oil.*—A standard commercial grade of diesel oil.

*Crude oil.*—A raw Oil Creek crude oil from the Eala Field in Pauls Valley, Oklahoma.

*Oklahoma No. 1 sand.*—A white Oklahoma sand essentially free of acid soluble materials and water swellable clays. It is composed of approximately 99% sand grains ranging from 60–20 mesh (U.S. Standard) in size.

*Urea-formaldehyde sand consolidating fluid.*—A 70% solids solution of 132:44.6:47.5 UF–85 concentrate, urea and water, respectively, by weight. At 82° F. the fluid weighed 10.387 pounds per gallon. This resin-forming mix is classified as thermosetting and some polymerization occurs in time even at low temperatures and without a chemical catalyst.

*Overflush solution.*—From 1–12 parts by volume of benzotrichloride to 100 parts by volume of diesel oil. See Table I below.

GENERAL PROCEDURE FOR EFFECTING LABORATORY SAND CONSOLIDATIONS IN TABLES I–V

A short section of glass tubing (28 mm. I.D. and 7" long) was vertically mounted on a ring stand. A perforated rubber stopper was inserted in the lower end of the column. A small section of copper wire screen was positioned over the perforation and over this screen was placed a thin section of glass wool.

For the major portions of the tests, 60 grams of dry Oklahoma No. 1 sand or formation sand were placed into the glass tubing. The exterior surface of the glass column was tapped until the sand had been reduced to a total height of 2.25". Through the sand was flushed (a) 30 ccs. standard brine formulation, (b) 30 ccs. diesel oil, (c) 20 grams consolidating fluid, and (d) 20 ccs. overflush solution. Fifteen p.s.i.g. of air pressure were applied in squeezing each fluid through. Each fluid was flushed down only to the top height of the sand prior to addition and squeezing of the next fluid.

After treatment the glass column was closed at the bottom and the entire assembly was placed in a constant temperature bath. The core at all times was covered with overflush solution. After an interval of time had elapsed the consolidated specimen was removed from the bath. When the glass had been broken away from the sand, a compressive strength test was run on the upper 1" portion; i.e., as measured after trimming. Some cores were sent in for permeability tests.

*Static working time tests.*—Ten ccs. consolidating fluid were placed in a stoppered section of glass tubing (28 mm. I.D. x 7" long). On top of this were added 10 ccs. of lighter overflush solution containing the benzotrichloride indirect catalyst. The tubing and its 80° F. contents were placed in a constant temperature mineral oil bath. The time was recorded that it took for the consolidating fluid to cloud and this was considered the static working time. Results of these tests can be found in Table I.

*Static chemical resistance of sand consolidations.*—Sand consolidations were made over varying temperature ranges. After each timed consolidation was effected, the overflush solution was flushed through the core with two pore volumes of the pertinent chemical resistance test solution—either brine, $H_2O$, or crude oil. Subsequently, the glass tubing was broken away from the consolidated core. It was transferred to a section of larger diameter glass tubing (rubber stoppered in the bottom) which was filled with the test solution. The column plus its contents were placed in a constant temperature oil bath. In each glass column (top section) was inserted a perforated rubber stopper to minimize evaporation. In 14 days the specimens were removed and compressive strength tests were made on the upper 1" of the core; i.e., measured after trimming. Results of these tests can be found in Table II.

*Viscosity of consolidating material.*—Brookfield viscosity measurements were taken at 82° F., 100° F., 120° F., and 150° F. Results of these tests can be found in Table III. The viscosity of this urea-formaldehyde consolidating solution is extremely acceptable for applying to formation sands which have been considered "tight." These viscosities are appreciably lower than those associated with present consolidating processes.

Table I

UREA-FORMALDEHYDE SAND CONSOLIDATIONS USING BENZOTRICHLORIDE AS THE CATALYST

| Temperature, °F. | Overflush Solution, Parts by Volume Respectively of Diesel Oil and Benzotrichloride | Working Time With Formula | Compressive Strength of Consolidation, p.s.i. | Permeability, Darcies |
|---|---|---|---|---|
| 80 | 100:12 | 5 Hrs | 5 Hrs.—480 | 2.2 |
| 100 | 100:12 | 2.5 Hrs | 3 Hrs.—750 | 1.9 |
| 120 | 100:12 | 1.25 Hrs | 3 Hrs.—600 | 1.6 |
| 130 | 100:12 | 1 Hr | 3 Hrs.—680 | 1.9 |
| 140 | 100:3 | 3 Hrs | 3 Hrs.—450 | 1.92 |
| 160 | 100:3 | 1 Hr | 3 Hrs.—840 | 1.12 |
| 180 | 100:2 | 55 Min | 3 Hrs.—990 | 1.82 |
| 200 | 100:1 | 30 Min | 3 Hrs.—860 | 2.07 |

Table II

STATIC CHEMICAL RESISTANCE TESTS OF UREA-FORMALDEHYDE SAND CONSOLIDATIONS

[80° F. Tests]

| Consolidation Identification | Core Immersion Fluid | Compressive Strength, p.s.i., of Consolidation After 14 Days | Compressive Strength of Consolidation Used as a Standard, p.s.i.ᵃ (See Table No. I) |
|---|---|---|---|
| 1A | Standard Brine | 520 | 480 |
| 1B | do | 480 | 480 |
| 1C | Fresh $H_2O$ | 320 | 480 |
| 1D | do | 490 | 480 |
| 1E | Crude Oil | 470 | 480 |
| 1F | do | 360 | 480 |

Table II—Continued

[100° F. Tests]

| | | | |
|---|---|---|---|
| 1G | Standard Brine | 675 | 750 |
| 1H | ----do---- | 900 | 750 |
| 1I | H₂O | 580 | 750 |
| 1J | H₂O | 650 | 750 |

[120° F. Tests]

| | | | |
|---|---|---|---|
| 2A | Standard Brine | 750 | 600 |
| 2B | ----do---- | 980 | 600 |
| 2C | Fresh H₂O | 840 | 600 |
| 2D | ----do---- | 500 | 600 |
| 2E | Crude Oil | 850 | 600 |
| 2F | ----do---- | 1,080 | 600 |

[130° F. Tests]

| | | | |
|---|---|---|---|
| 3A | Standard Brine | 1,200 | 680 |
| 3B | ----do---- | 1,200 | 680 |
| 3C | Fresh H₂O | 740 | 680 |
| 3D | ----do---- | 1,000 | 680 |
| 3E | Crude Oil | 840 | 680 |
| 3F | ----do---- | 1,100 | 680 |

[140° F. Tests]

| | | | |
|---|---|---|---|
| 2G | Standard Brine | 1,000 | 450 |
| 2H | ----do---- | 1,150 | 450 |
| 2I | Fresh Water | 980 | 450 |
| 2J | ----do---- | 940 | 450 |
| 2K | Crude Oil | 1,380 | 450 |
| 2L | ----do---- | 780 | 450 |

[180° F. Tests]

| | | | |
|---|---|---|---|
| 2M | Standard Brine | 900 | 990 |
| 2N | ----do---- | 1,070 | 990 |

ª Cores used for standards were flushed with consolidating and overflush solutions. Compressive strengths were taken after three hours; i.e., 100° F. and higher. Five hours were allowed for 80° F. tests prior to strength tests.

Table III

VISCOSITY MEASUREMENTS WITH CONSOLIDATING SOLUTION

| Temperature, °F. | Viscosity, Centipoises | Spindle No. | Spindle, r.p.m. |
|---|---|---|---|
| 82 | 14.5 | 1 | 30 |
| 100 | 10.8 | 1 | 30 |
| 120 | 7.6 | 1 | 30 |
| 150 | 3.5 | 1 | 30 |

In addition to the above tests, sands from actual well formations were consolidated using a similar laboratory procedure. These sands, except as noted in Table IV below, were consolidated as received from the field and were not subjected to cleaning techniques. Results indicated that satisfactory sand consolidations are obtained when the sands are preferentially water wet and relatively low in acid soluble materials.

Table IV

CONSOLIDATION OF TYPICAL FORMATION SANDS

| Sand Identification | Percent Acid Soluble Materials | Compressive Strength of Consolidations, p.s.i. | Consolidation Temp., °F. | Consolidation Length, Hrs. |
|---|---|---|---|---|
| Grouting sand—Compressor Foundation Sand, Bakersfield, California | .2 | 720 | 120 | 3 |
| Modosorin Sand, Adams Ranch Field | ¹0 | 480 | 120 | 3 |
| Grouting Sand, Omaha, Nebraska | ²1.6 to 4 | (⁵) | 120 | 3 |
| Greta Formation, Bloomington Field, Texas | ¹0 | 975 | 120 | 3 |
| Dittis Formation, Callahan Field | ¹0 | 760 | 120 | 3 |
| Chas. A. Daubert Co., Soehorge Well No. 2 | ¹0 | 790 | 120 | 3 |
| Marginuline Formation, Laward Field | .2 | (³ ⁵) | 120 | 3 |
| Do. | .2 | ⁴125 | 120 | 3 |

¹ Less than .2%.
² Note high acid soluble material content—this probably prevented the sand from consolidating adequately. It is believed that the catalyst (benzotrichloride produced acid) was spent before resin curing mechanism was completed.
³ This sample of sand had been stored in a plastic bag for several months. It appeared very oil wet. The inability of the resin forming materials to consolidate this sand is believed to be due to this oil wet surface.
⁴ Sixty ccs. of 2% Hyflo, a Halliburton Company surfactant, in diesel oil (by volume) were used as the preflush in lieu of straight diesel oil. This was done in an effort to change the oil wettability characteristics of the sand to one predominantly classified as preferentially water wet. It produced improved results over core above.
⁵ No appreciable strength.

Additional laboratory tests were made, wherein the procedures and materials set forth hereinabove were used, with the exception that the benzotrichloride catalysts was left out of the diesel oil overflush solution. The results of these tests are illustrated in Table V.

*Table V*

UREA-FORMALDEHYDE (THERMALLY POLYMERIZED) SAND CONSOLIDATIONS UTILIZING NO CHEMICAL CATALYST

| Sample | Consolidation Temperature, °F. | Comments |
| --- | --- | --- |
| 4A | 80 | No appreciable consolidation in 120 hrs. |
| 4B | 80 | Do. |
| 4C | 120 | Do. |
| 4D | 130 | Do. |
| 4E | 140 | Acceptable consolidation effected over 72 hrs. and less than 120 hrs. |
| 4F | 140 | Do. |
| 4G | 160 | Acceptable consolidation effected in less than 36 hrs. |
| 4H | 180 | Do. |

Results of these tests found in Table V show that Oklahoma No. 1 sand consolidations could be attained without the benefit of a catalyst at 140° F. in less than 120 hours and at 180° F. in less than 36 hours. These tests disclose the temperature which facilitates an effective curing of the ureaformaldehdye polymerizable material without the benefit of a chemical catalyst(s). Should the overflush (containing the catalyst) not contact all the placed consolidating fluid, a sand consolidation will occur at 140° F. and above and with the afore-mentioned time perimeters. It should be understood, however, that consolidations attained in this manner will possess little permeability as no overflush solution has been used to remove the excess plastic from the pores existing between the sand grains.

As the requirements for a satisfactory sand consolidation job are very high, i.e., the entire formation adjacent to the well bore has to be consolidated regardless of permeability variations if sand is to remain behind the perforations during production, additional tests were made. These tests illustrate the results of treating 3½ cubic feet of sand with one gallon of consolidating fluid through a single ½" perforation. The chemicals and materials used were the same as those used in the tests set forth hereinabove.

GENERAL PROCEDURE AND CONDITIONS OF TESTING FOR OBTAINING RESULTS SHOWN IN TABLES VI AND VII

This experimental equipment permitted treatment of sand placed behind a single ½" perforation. An iron chamber (20" I.D., inlet end; 18" I.D. outlet end; 16" in height) was filled with approximately 350 pounds No. 1 Oklahoma sand. The sand was added continuously to the chamber with a water level being maintained always higher than the highest sand level. The sand was packed farther by attaching an electric vibrator to the vessel and allowing it to operate for a period of time. The sand was sealed inside the chamber by the use of a flange-rubber gasket setup.

The equipment was so designed that fluid could be introduced through a ½" perforation. After traveling the entire length of the vessel (16"), it was forced out of the container through some ten ¼" openings.

The pore volume of the sand contained in the chamber was calculated to be 7-8 gallons based on an approximately 30 percent porosity.

Treatment procedure was as follows: Eleven gallons of diesel oil were pumped through the sand to remove the excess water from the pore spaces. With this particular experiment, the diesel oil went in rather slowly and only 20 p.s.i. were recorded at the surface of the sand. One gallon of consolidating fluid (80° F. formula) was then pumped into the sand at 1.5 gallons per minute. Immediately following, two gallons of overflush solution (80° F. formula) were forced in. Displacement of the overflush to the perforation was made with diesel oil. The rate of overflush injection was extremely slow due to a faulty operating pump. It had been hoped that an injection rate of 1.5 to 2 gallons per minute with all fluids could be obtained. Although suggested consolidating time was only five hours, an overnight period was permitted (15 hours). Consolidation temperature was 80–100° F. (estimated 5–6 hours near 100° F.).

*Geometry of resulting consolidation.*—A water pressure line was used to remove the loosely consolidated to unconsolidated sand away from the spherical harder mass. When the ½" perforation inlet was removed from the consolidated mass it showed that a space free of sand was found extended 0.75" directly out from the perforation. Diameter of this circular space was 1". The dimensions of this aforementioned space around the perforation inlet cannot be considered excessive. For the sake of obtaining the volume of sand consolidated, the geometry was assumed to be a perfect sphere with a circumference of 46". Calculation on this basis indicated that 0.9572 cubic foot of sand was satisfactorily consolidated with one gallon of consolidating fluid.

Permeabilities reported in Table VI hereinbelow decreased as the distance from the perforation became greater. This was as expected since more overflush contacted the sand nearer the perforation inlet proper. However, the permeability variations were not as great as were predicted. Good retention of consolidating material in the area immediately adjacent to the perforation outlet was found. Urea-formaldehyde solutions are known for their affinity for sand-like surfaces. This can be a very important property with any consolidating fluid used in the manner as mentioned above. However, increased overflush volumes would probably improve the permeabilities throughout the entire consolidation and more specifically in the outer perimeter areas.

Table VII shows that the compressive strength of the consolidation increased as the distance from the perforation became greater. The probable reason for this is that less consolidating fluid was washed away by the overflush as the distance became more removed from the perforations. A compressive strength of 597 p.s.i. was, however, attained at the perforation proper. All the consolidation strengths appeared very satisfactory.

*Table VI*

PERMEABILITY INDEX OF 3½ CUBIC FEET SAND CONSOLIDATION

| Core [a] | Permeability, Darcies [b] | Distance and Direction Core Was Retrieved From Center of Perforation Inlet | |
| --- | --- | --- | --- |
| A | 1.975 | 2–2.75" | 90° From Perforation Inlet Direction. |
| B | 1.710 | 2–3" | Do. |
| C | 1.510 | 3.5–4.25" | Do. |
| D | [c] 0.716 | 4.5–5.25" | Do. |
| E | 1.60 | 5.5–7" | Direction Analogous With Perforation Inlet Direction. |
| F | [c] 0.774 | 7.5–9" | Do. |

[a] Cores were 0.75" in diameter.
[b] Air was used as the permeability medium.
[c] Additional overflush was probably needed at these outer edges.

Table VII
COMPRESSIVE STRENGTH INDEX OF 3½ CUBIC FEET SAND CONSOLIDATION

| Core [a] | Compressive Strength of Consolidation, p.s.i. | Distance and Direction of Core Location in Reference to Center of Perforation Outlet | |
|---|---|---|---|
| A | 597 | Directly Below the Perforation. | |
| B | 542 | 1.75–2.5″ | 90° Perpendicular to Direction of Flow. |
| C | 522 | 2–2.75″ | Do. |
| D | 677 | 2.25–3″ | Do. |
| E | 664 | 3.5–4.25″ | Do. |
| F | 919 | 4.5–5.25″ | Do. |
| G | 1,016 | 5.5–7″ | Directly Below the Perforation Outlet. |
| H | 801 | 7.5–9″ | Do. |
| I | [b] 199.7 | 8–9.5″ | Do. |

[a] Cores were 0.75″ in diameter.
[b] Outer edge was weakly consolidated.

In summary of these latter tests, illustrated in Tables VI and VII, one gallon of consolidating fluid consolidated approximately one cubic foot of Oklahoma No. 1 sand. An increase of overflush quantities would normally increase this. The geometry of the consolidation was approaching that of a sphere. A small circular vacant space, 0.75″ deep and 1″ in diameter, extended out from the 0.5″ perforation outlet. Permeability of the consolidation was not uniform but a definite pattern did exist. The permeability decreased as the distance became greater from the perforation outlet. This was as predicted. Permeabilities ranged from 0.72–1.98 darcies.

The comprehensive strength tests showed that the consolidation became stronger as the distance became greater from the perforation outlet. This was attributed to the predicted overflush pattern. Compressive strengths ranged from 500–1000 p.s.i. The tests further showed that approximately three volumes of overflush solution; i.e., based on the quantity of consolidating fluid, are required to increase the permeabilities on the outer perimeter of the consolidation. The thin consolidating fluid had the desirable characteristic of having exceptional affinity for sand grain surfaces. The results indicated that larger quantities of overflush pumped at faster rates could be tolerated.

The process can be applied to formations whose environmental temperature ranges from 80° F. to 200° F. or more. The viscosity of the consolidating solution is relatively low; i.e., 14.5 centipoises at 82° F. and 3.5 centipoises at 150° F. This is a marked reduction in viscosity over prior art formulas. With this lower viscosity fluid, low permeability sands can be treated more effectively. An acid curable system has a tendency to shrink clays; however, such a process does have limitations placed on its application in formations containing acid soluble materials. Satisfactory sand consolidations with formation sands have been made when 0.2% carbonates were present.

Tests indicate that the sand must be preferentially water wet prior to consolidation attempts. Proper pretreatment of the formation with surfactants is beneficial in changing the oil wettability of a formation to one which is preferentially water wet. This wettability limitation is placed on all presently available sand consolidation methods used in the field.

In carrying out the process of the present invention, only five hours shut-in time are necessary at 80° F. and three hours are adequate at 100° F. and higher. It is believed that a second stage treatment on a well can be run in one to three hours after completion of first stage. Average mixing and pumping time for a one-stage job is one hour.

Chemical resistance of the cured plastic is satisfactory to water, brine and crude oil. The consolidating material has the desired affinity for the sand grain surfaces; i.e., to the extent excessive removal of the same by the overflush is kept to a desired minimum. Above 140° F. the consolidating fluid can be expected to cure up with time if the catalyst overflush solution does not contact it.

A new and improved and economical sand consolidation method has been developed utilizing an acid polymerizable material such as urea-formaldehyde. Other acid curable resinous formulations may be used within the scope of the invention, without departing therefrom. Furfuryl alcohol resins have also been successfully tested in the same manner as for the above described urea-formaldehyde resins.

In carrying out the process or method of the present invention in the field, the following procedure is illustrative of one preferred way:

As with all sand consolidation processes, the well must be cleaned of all its perforation and formation sand plugging materials; e.g., drilling muds and other foreign materials in the hole. This may be accomplished by circulating the hole with brine, oil, or some mud clean-out agents or in any other suitable manner. The heavy crudes must be forced back away from the perforation proper. Low viscosity diesel oil can be used for this. A preflush containing Hyflo, an oil soluble surface active agent as described in U.S. Patent No. 2,946,747 and Halliburton Company trademark therefor, or other suitable surfactant, in diesel oil is preferably carried out to insure that the formation sand is made preferentially water wet. The preflush, consolidating, and overflush solutions are squeezed into the sanding intervals by isolating the zones with appropriate packers, or by using a modified Yowell tool in a similar manner as it has been used in the prior art.

The consolidating solution is very thin and it is conceivable that formations of varying permeabilities can be treated in a more uniform manner as compared to when thicker, heavy fluids are used. Less resistance is also likely to be encountered with it entering the tighter areas of the formation. Nevertheless, two stage treatments will tend to insure better equalization of formation penetration depth of a consolidation fluid.

After displacement of the overflush with oil to the perforation, the well should be shut in for a specfied interval in preparation for a second treatment of resuming production.

If the well is old and has been producing sand for some time, it is recommended that a quantity of sand be packed back into the formation behind the perforation prior to carrying out a job. It is believed the sand should not be as large as the fracturing sands now normally used in the field. The only criterion which should regulate the size of the sand is that its permeability should be equal to or slightly greater than that of the formation sand. The smaller the pack sand, the stronger the consolidation will be at the perforation.

A number of laboratory tests were made using a variety of the halogenated acid and acid producing chemicals or compounds for curing several resin systems used in sand consolidations. The procedure and results of these tests are set forth hereinbelow and in Tables VIII–X.

Copending application Serial No. 260,826, filed even date herewith, sets forth in detail the advantages of using the silane or organosilicon compound, gamma aminopropyltriethoxysilane, used in some of these tests.

Copending application Serial No. 260,831, filed even date herewith, sets forth in detail the new and novel furfuryl alcohol resin system, including formulation and method, which was also used in some of these tests described hereinafter.

The procedure and materials used for these tests are as follows.

Procedure: A section of glass tubing, 1 in. I.D. x 7 in. in length, containing a 15/16 in. I.D. insert of Buna N rubber tubing was vertically mounted on a ring stand.

A perforated rubber stopper was inserted in the lower end of the glass column. A small section of copper wire screen was positioned over the perforation and over this screen was placed a thin section of glass wool.

Oklahoma No. 1 sand containing 12% calcium carbonate (marble chips crushed to essentially same particle size as sand), by weight, was packed in the tubing to a height of 2.5 in. The sand was then flushed with the following solutions: 30 cc. of standard brine solution, disclosed hereinabove; 30 cc. of diesel oil; 15 cc. of consolidating fluid or resin system; 250 cc. of diesel oil; and 250 cc. of diesel oil with catalyst dissolved therein. (Amount of catalyst used is set forth in the tables hereinbelow.) All fluids were heated to 140° F. prior to squeezing through the sand. Fluid injection pressure was 4–6 p.s.i. except as indicated in tables. Compressive strength measurements were made on the cores as they were exposed to air at 80° F.

*Consolidating fluids (parts by weight)*

Furfuryl alcohol resin systems:
  (A) 121 Durez 21687 furfuryl alcohol resin
     1.42 gamma aminopropyltriethoxysilane
     226 furfuryl alcohol
     10 water
     1.43 Hyflo

*Consolidating fluids (parts by weight)*—Continued

Furfuryl alcohol resin systems:
  (B) 121 Durez 21687 furfuryl alcohol resin
     1.42 gamma aminopropyltriethoxysilane
  (C) 121 Durez 21687 furfuryl alcohol resin Phenol formaldehyde resin systems:
  (D) 121 Durez 21587 phenol formaldehyde resin
     1.42 gamma aminopropyltriethoxysilane
     226 furfuryl alcohol
     1.43 Hyflo
  (E) 121 Durez 21587 phenol formaldehyde resin
     1.42 gamma aminopropyltriethoxysilane
     226 furfuryl alcohol
  (F) 121 Durez 21587 phenol formaldehyde resin
     226 furfuryl alcohol Urea formaldehyde resin systems:
  (G) 121 Durez 21587 phenol formaldehyde resin
  (H) 132 UF–85 concentrate
     44.6 urea
     47.5 water
     1.42 gamma aminopropyltriethoxysilane
     226 furfuryl alcohol
  (I) 132 UF–85 concentrate
     44.6 urea
     47.5 water
     1.42 gamma aminopropyltriethoxysilane

*Table VIII*

FURFURYL ALCOHOL RESIN

| Run No. | Consolidating Fluid | Catalyst | Amount of Catalyst per 250 cc. Diesel Oil | 80° in Air Compressive Strength (p.s.i.) |
|---|---|---|---|---|
| 1 | A | Trichloroacetic Acid | 2.5 g | 824 |
| 2 | A | Dichloroacetic Acid | 2.5 cc | 629 |
| 3 | A | Monochloroacetic Acid | 1 g | 539 |
| 4 | A | 2-chloropropionic | 5 cc | 508 |
| 5 | A | Glacial Acetic Acid | 10 cc | 115 |
| 6 | A | Hexachloroacetone | 12.5 cc | 793 |
| 7 | A | Benzotrichloride | 12.5 cc | 403 |
| 8 | A | Trifluoroacetic Acid | 2.5 cc | *230 |
| 9 | A | Monochlorodifluoroacetic Acid | 2.5 cc | *350 |
| 10 | B | Trichloroacetic Acid | 2.5 g | *3,068 |
| 11 | B | Benzotrichloride | 12.5 cc | *403 |
| 12 | B | Hexachloroacetone | 12.5 cc | *565 |
| 13 | B | Monochloroacetic | 1 g | *473 |
| 14 | C | Hexachloroacetone | 12.5 cc | 2,007 |
| 15 | C | Benzotrichloride | 12.5 cc | 1,113 |
| 16 | C | Butyl Oxalate | 12.5 cc | 1,171 |
| 17 | C | Benzoic Acid | 1 g | 55 |
| 18 | C | Acrylic Acid | 12.5 cc | 915 |
| 19 | C | Acetic Acid | 12.5 cc | 443 |
| 20 | C | Bromoacetic Acid | 1 g | 1,092 |
| 21 | C | Monochloroacetic Acid | 1 g | 1,032 |
| 22 | C | Dichloroacetic Acid | 2.5 cc | 455 |
| 23 | C | Trifluoroacetic Acid | 1.25 g | 1,038 |
| 24 | C | Monochlorodifluoroacetic Acid | 2.5 g | 1,142 |
| 25 | C | 3-chloropropionic Acid | 5 g | 813 |
| 26 | C | Dioctylchlorophosphate | 12.5 cc | 1,222 |
| 27 | C | Ethylchlorocarbonate | 12.5 cc | 1,399 |
| 28 | C | α,α,α,α′,α′,α′-Hexachloro-p-Xylene | 12.5 cc | 642 |
| 29 | C | 2-chloropropionic | 5 cc | 1,393 |
| 30 | C | Ethylchloroacetate | 12.5 cc | 483 |
| 31 | C | Trichloroacetic Acid | 2.5 g | 1,125 |
| 32 | C | Iodoacetic Acid | 1 g | 1,240 |

*Fluid injection pressure was 15 p.s.i. rather than 4–6 p.s.i.

*Table IX*

PHENOL FORMALDEHYDE RESIN

| Run No. | Consolidating Fluid | Catalyst | Amount of Catalyst per 250 cc. Diesel Oil | 80° in Air Compressive Strength (p.s.i.) |
|---|---|---|---|---|
| 1 | D | Trichloroacetic Acid | 2.5 g | 1,478 |
| 2 | E | ----do---- | 2.5 g | 1,455 |
| 3 | E | Hexachloroacetone | 12.5 cc | 1,032 |
| 4 | E | Dichloroacetic Acid | 2.5 cc | 635 |
| 5 | E | Benzotrichloride | 12.5 cc | 1,194 |
| 6 | F | Trichloroacetic Acid | 2.5 g | 745 |
| 7 | G | ----do---- | 2.5 g | 739 |

Table X
UREA FORMALDEHYDE RESIN

| Run No. | Consolidating Fluid | Catalyst | Amount of Catalyst per 250 cc. Diesel Oil | 80° in Air Compressive Strength (p.s.i.) |
|---|---|---|---|---|
| 1 | H | Trichloroacetic Acid | 2.5 g | 1,180 |
| 2 | I | do | 10 g | 271 |
| 3 | I | Hexachloroacetone | 12.5 cc | 271 |
| 4 | I | Benzotrichloride | 12.5 cc | 50 |

Trichloroacetic acid is preferred to the other catalysts disclosed herein. Hexachloroacetone, which produces trichloroacetic acid as a hydrolysis product and benzotrichloride are preferred among the acid producing catalysts.

As the success of an in situ sand consolidation method as disclosed herein, is largely dependent upon the ability of the resin or resin system to rapidly extract a catalyst from a mobile oil solution, varying degrees of success will be achieved by using different combinations of such resins and catalysts.

With the low viscosity resins used in achieving permeable consolidations of loose or incompetent sands, it is only necessary that the catalyst contact the surface of the resin on the sand grains, in order for such resin to be cured or hardened.

Small amounts of the catalyst dispersed in the oil are preferable, not only because of economics, but that the resin absorption capacity of the catalyst is apparently fixed and no advantage is obtained in using large amounts of catalyst.

Satisfactory consolidations using a furfuryl alcohol resin and trichloroacetic acid as the catalyst have been obtained with ratios ranging from 82:0.2 to 82:3 parts by weight, of diesel oil and trichloroacetic acid, respectively. It was observed, however, that some charring of the resin occurred at temperatures over 160° F. when the ratio of diesel oil to trichloroacetic acid exceeded 82:1, parts by weight.

It is believed that it is within the purview of one skilled in the art to ascertain the optimum ratios of various catalyst to oil to be used with various resins, resin systems or resin forming materials used in the consolidation of loose or incompetent sands.

It should be noted that there are a wide variety of resin formulations, and new ones are being discovered every day. Some of these are not suitable for sand consolidation; however, any resinous formulation or material which is suitable for sand consolidation and which is acid curable may be used in the present invention without departing from the scope thereof. The present invention is therefore not limited to the use of any specific resin or resin formulation.

Broadly, the present invention relates to a new and improved method of curing or polymerizing an acid curable resin in situ.

What is claimed is:

1. A method of permeably consolidating preferentially water wet loose sands, comprising the steps of:
    (a) introducing a non-catalyst bearing acid curable formulation into a formation to be consolidated; and,
    (b) introducing an oil overflush solution having a relatively high degree of immiscibility with the resin formulation into the formation, said overflush solution containing a predetermined amount of benzotrichloride dispersed therein whereby acid is delayedly produced for curing said resin formulation, thereby consolidating the formation into a hard permeable mass.

2. A method of permeably consolidating preferentially water wet loose sands, comprising the steps of:
    (a) introducing a non-catalyst bearing acid curable resin formulation into a formation to be consolidated; and,
    (b) introducing an oil overflush solution having a relatively high degree of immiscibility with the resin formulation into the formation, said overflush solution containing a predetermined amount of hexachloroacetone dispersed therein whereby acid is delayedly produced for curing said resin formulation, thereby consolidating the formation into a hard permeable mass.

3. A method of permeably consolidating preferentially water wet loose sands, comprising the steps of:
    (a) introducing a non-catalyst bearing acid curable resin formulation into a formation to be consolidated; and,
    (b) introducing an oil overflush solution having a relatively high degree of immiscibility with the resin formulation into the formation, said overflush solution containing a predetermined amount of trichloroacetic acid dispersed therein for curing said resin formulation, thereby consolidating the formation into a hard permeable mass.

4. A method of permeably consolidating preferentially water wet loose sands, earthen formations and the like, comprising the steps of:
    (a) introducing a non-catalyst bearing acid curable resin formulation into the formation to be consolidated; and
    (b) introducing an oil overflush solution having a relatively high degree of immiscibility with the resin formulation into the formation, said overflush solution containing a predetermined amount of a catalyst dispersed therein, said catalyst being selected from the group consisting of halogenated aliphatic monocarboxylic acids, halogenated and nitrated aryl monocarboxylic acids, unsubstituted monocarboxylic acids, alkyl aryl halides, halogenated ketones, esters of halogenated and cyano substituted aliphatic carboxylic acids, esters of aliphatic dicarboxylic acids, esters of halogenated inorganic acids, and mixtures thereof, thereby consolidating the loose sands into a hard permeable mass.

5. The method of claim 4, wherein a diesel oil spacer is used between said resin formulation and said oil overflush solution.

6. The method of claim 4, wherein the formation is preflushed with a liquid selected from the group of brine, mineral oil, and mud clean-out agents.

7. A method of permeably consolidating preferentially water wet loose sands, earthen formations and the like, comprising the steps of:
    (a) introducing a non-catalyst bearing acid curable resin formulation into the formation to be consolidated; and
    (b) introducing a diesel oil overflush solution containing a quantity of a catalyst dissolved therein, said catalyst being selected from the group consisting of halogenated aliphatic monocarboxylic acids, halogenated and nitrated aryl monocarboxylic acids, unsubstituted monocarboxylic acids, alkyl aryl halides, halogenated ketones, esters of halogenated and cyano substituted aliphatic carboxylic acids, esters of aliphatic dicarboxylic acids, esters of halogenated inorganic acids, and mixtures thereof, thereby consolidating the loose sands into a hard permeable mass.

8. The method of claim 7, wherein the catalyst is benzotrichloride.

9. The method of claim 7, wherein the catalyst is hexachloroacetone.

10. The method of claim 7, wherein the catalyst producing chemical is trichloroacetic acid.

11. The method of claim 7, wherein the resin formulation is selected from the group consisting of a urea-formaldehyde resin formulation, a phenol formaldehyde resin formulation, and a furfuryl alcohol resin formulation.

12. In a method of fracturing an earth formation, the steps of:
 (a) pumping into the earth formation a fracturing fluid containing propping agents previously coated with an acid hardenable bonding material; and
 (b) pumping into the earth formation an overflush solution containing a quantity of an acid producing chemical dissolved therein for hardening the bonding material on the propping agents previously placed in the formation, said acid producing chemical being selected from the group consisting of halogenated aliphatic monocarboxylic acids, halogenated and nitrated aryl monocarboxylic acids, unsubstituted monocarboxylic acids, alkyl aryl halides, halogenated ketones, esters of halogenated and cyano substituted aliphatic carboxylic acids, esters of aliphatic dicarboxylic acids, esters of halogenated inorganic acids, and mixtures thereof, thereby consolidating the propping agents into a hard permeable mass.

13. The method of claim 12, wherein the acid hardenable bonding material is a urea-formaldehyde resin consolidating fluid.

14. The method of claim 12, wherein the acid hardenable bonding material is a furfuryl alcohol resin consolidating fluid.

15. The method of claim 12, wherein the acid producing chemical is benzotrichloride.

16. The method of claim 12, wherein the acid producing chemical is trichloroacetic acid.

17. In a method of fracturing an earth formation, the steps of:
 (a) pumping into the earth formation a fracturing fluid containing propping agents previously coated with an acid hardenable bonding material; and
 (b) pumping into the earth formation a diesel oil overflush solution containing a quantity of an acid producing chemical dissolved therein for hardening the bonding material on the propping agents previously placed in the formation, said acid producing chemical being selected from the group consisting of halogenated aliphatic monocarboxylic acids, halogenated and nitrated aryl monocarboxylic acids, unsubstituted monocarboxylic acids, alkyl aryl halides, halogenated ketones, esters of halogenated and cyano substituted aliphatic carboxylic acids, esters of aliphatic dicarboxylic acids, esters of halogenated inorganic acids, and mixtures thereof, thereby consolidating the propping agents into a hard permeable mass.

References Cited by the Examiner

UNITED STATES PATENTS

| | | | |
|---|---|---|---|
| 2,001,350 | 5/35 | Mills | 166—38 |
| 2,237,634 | 4/41 | Rosen | 260—57 |
| 2,345,611 | 4/44 | Lerch et al. | 166—33 |
| 2,823,753 | 2/58 | Henderson et al. | 166—33 X |
| 2,986,538 | 5/61 | Nesbitt et al. | 166—33 X |
| 3,097,692 | 7/63 | Holland et al. | 166—33 |
| 3,097,694 | 7/63 | Kerver | 166—42.1 |
| 3,100,527 | 8/63 | Hilton et al. | 166—33 |
| 3,115,930 | 12/63 | Bernard | 166—33 |
| 3,123,137 | 3/64 | Young et al. | 166—38 |

OTHER REFERENCES

The Condensed Chemical Dictionary, Reinhold Publishing Co., New York, 1961.

CHARLES E. O'CONNELL, *Primary Examiner.*

UNITED STATES PATENT OFFICE

CERTIFICATE OF CORRECTION

Patent No. 3,209,826                                         October 5, 1965

Bill M. Young

It is hereby certified that error appears in the above numbered patent requiring correction and that the said Letters Patent should read as corrected below.

Column 3, line 42, for "propane" read -- propanone --; column 11, line 31, for "comprehensive" read -- compressive --; column 15, line 62, after "curable" insert -- resin --.

Signed and sealed this 26th day of April 1966.

(SEAL)
Attest:

ERNEST W. SWIDER
Attesting Officer

EDWARD J. BRENNER
Commissioner of Patents